United States Patent
Holford et al.

(10) Patent No.: US 9,037,893 B2
(45) Date of Patent: May 19, 2015

(54) SYNCHRONIZING DATA TRANSFER FROM A CORE TO A PHYSICAL INTERFACE

(71) Applicant: ANALOG DEVICES, INC., Boston, MA (US)

(72) Inventors: Brian Holford, High Point, NC (US); Matthew D. McShea, Summerfield, NC (US)

(73) Assignee: ANALOG DEVICES, INC., Norwood, MA (US)

( * ) Notice: Subject to any disclaimer, the term of this patent is extended or adjusted under 35 U.S.C. 154(b) by 276 days.

(21) Appl. No.: 13/852,625

(22) Filed: Mar. 28, 2013

(65) Prior Publication Data

US 2014/0281654 A1   Sep. 18, 2014

Related U.S. Application Data

(60) Provisional application No. 61/799,202, filed on Mar. 15, 2013.

(51) Int. Cl.

| | | |
|---|---|---|
| *G06F 1/00* | (2006.01) | |
| *G06F 1/04* | (2006.01) | |
| *G06F 1/24* | (2006.01) | |
| *G06F 5/06* | (2006.01) | |
| *G06F 13/42* | (2006.01) | |
| *H04B 1/00* | (2006.01) | |
| *H04J 3/06* | (2006.01) | |

(52) U.S. Cl.
CPC .............. *G06F 1/04* (2013.01); *G06F 13/4243* (2013.01); *G06F 1/24* (2013.01); *H04B 1/00* (2013.01); *H04J 3/0685* (2013.01)

(58) Field of Classification Search
CPC ......... G06F 1/04; G06F 1/24; G06F 13/4243; H04B 1/00; H04J 3/0685
USPC ................................. 713/400, 401, 500, 600
See application file for complete search history.

(56) References Cited

U.S. PATENT DOCUMENTS

| | | | | |
|---|---|---|---|---|
| 5,862,373 | A | * | 1/1999 | Pathikonda et al. .......... 713/501 |
| 7,689,853 | B2 | * | 3/2010 | Susnow ......................... 713/400 |
| 2010/0122107 | A1 | | 5/2010 | Arimilli et al. |
| 2010/0162037 | A1 | | 6/2010 | Maule et al. |

OTHER PUBLICATIONS

JEDEC Standard, "Serial Interface for Data Converters," JESD204B.01, Jan. 2012, JEDEC Solid State Technology Association, 145 pages.
European Search Report in EP Application Serial No. 14156669.5 mailed Jul. 1, 2014, 6 pages.

* cited by examiner

*Primary Examiner* — Mark Connolly
(74) *Attorney, Agent, or Firm* — Patent Capital Group

(57) ABSTRACT

In one example implementation, the present disclosure provides a system that includes circuitry and one or more electronic components for synchronizing data transfer from a core to a physical interface. One example can involve an apparatus for interfacing a digital core with at least one physical interface that includes a macro configured on the digital core, the macro having at least one data output, a first data input, a reset input and a sync reset output, the macro to be clocked by a first clock having a first clock rate. The first clock can be configured to clock in data from the digital core on the first data input; clock in a reset signal from the digital core on the reset input, wherein a synchronized reset signal is output on the sync reset output. The apparatus can also include physical interface circuitry and a reset sampling input.

29 Claims, 7 Drawing Sheets

SYNCHRONIZING DATA TRANSFER FROM A CORE TO A PHYSICAL INTERFACE

PRIORITY DATA

This application is a non-provisional of U.S. Provisional Patent Application Ser. No. 61/799,202, filed Mar. 15, 2013, which is hereby incorporated by reference in its entirety.

TECHNICAL FIELD OF THE DISCLOSURE

The present disclosure relates generally to interfacing digital circuits to physical interfaces and, more particularly, to the synchronization of data transfer from a digital core to multiple channel physical interfaces.

BACKGROUND

Present day digital circuit applications are becoming increasing sophisticated as the range of applications for these circuits increases. As one example of this, analog-to-digital converters (ADCs) utilize sampling circuitry that samples an analog input signal at points in time, and then converts the samples to digital values to create a digital signal. The use of ADCs is common for certain types of applications, which can involve receiving an input signal or input data represented by an analog signal, and then converting the analog signal to a digital signal for further processing in a digital form. Many other applications of digital data transfer also exist.

There is a need for high-speed digital transfers in many types of modern data handling applications including wireless infrastructure (e.g., GSM, EDGE, W-CDMA, LTE, CDMA2000, WiMAX, WiFi, TD-SCDMA, etc.), transceiver architectures, software-defined radios, portable instrumentation, medical ultrasound equipment, and military/aerospace applications. For example, the continuing increase in sophistication of technologies for processing audio, video, or other types of analog signals (e.g., from various types of sensors) has caused an accompanying need to increase the technical capabilities of ADCs. In addition, a similar increase is warranted in the technical capabilities and performance of the analog interface and the digital interface circuitry that interacts with ADCs. Many applications require increasingly higher numbers of data inputs and outputs between high-speed data converters and other devices (e.g., field-programmable gate arrays (FPGAs), digital signal processors (DSP), etc.).

The synchronization of transferred data between high-speed data converters and other devices becomes increasingly more difficult, as the number of data inputs and outputs interfacing between the devices increases. For example, when data is transferred from an ADC to another device, it may be necessary to implement any number of high-speed serial channels, each over a separate physical interface, where the physical interfaces are separated. Data generated at the core of an ADC should be routed to separate physical interfaces. This routing can cause problems with signal latency. Hence, certain links can have multiple parallel high-speed serial channels for a potential aggregate data link (e.g., 100 GB/s), where minimum latency is desired on the link. Each high-speed serial channel can be a physical interface (PHY) and each physical interface channel can be physically separated by millimeters on a corresponding die. The data generated in the core can be routed to eight locations (e.g., separated by as much as 5 mm).

Additionally, there are timing differences in the arrival of data at the different interfaces. Clock signals at each of the physical interfaces could be skewed relative to one another, causing problems in that the timing of output data on each of the physical interfaces will be different. Each core-to-physical interface data handoff can have different timing and, further, metastability will be a concern if a globally routed physical interface clock is used. Metastability generally describes the behavior of certain physical systems that can exist in long-lived states that are less stable than the system's most stable state.

One solution to the synchronization problem has been to use a first-in-first-out structure to ensure the data handoff on the interface. However, the first-in-first-out structure creates an additional expense in latency. Another solution involves delivering the data directly from the core to the physical interface boundary and, thereby, the system accepts the potential metastability at the core-to-physical interface boundary. Hence, each of these solutions has drawbacks and tradeoffs. Therefore, in ADCs (along with any other appropriate applications of digital data transfer), it would be desirable to have a solution for interfacing between a digital core and a physical interface that could reduce both latency and metastability problems in data transfers between devices.

Overview

The present disclosure relates generally to an apparatus and a method for synchronizing data transfer from a digital core to a physical interface (PHY). The method and apparatus can be embodied in circuitry that interfaces an analog-digital-converter (ADC) core to a physical interface. In one embodiment, the core has its own ADC core clock and the physical interface has its own phase-locked-loop (PLL). In one example implementation, the PHY section contains a baudrate PLL, as discussed below. In general terms, there is no inherent phase relationship between the ADC core clock and the clock of the physical interface.

A core reset signal can be synchronized to the core clock and then oversampled at the physical interface by a clock generated from the PLL clock. This can be used to generate a physical interface sampled reset signal. The sampled reset signal can be used to synchronize a physical interface clock (at a rate of baudrate/M) with the core clock (at a rate baudrate/M, to within a known margin). The physical interface clock can then be used to clock data into the physical interface from the core outputs that are being clocked by the core clock.

In another embodiment, the circuitry can be implemented such that a reset signal in the core is clocked into a core macro using a macro clock, which is at a rate (e.g., baudrate/M) sufficient to generate a macro clock synchronized reset. The macro clock synchronized reset is then oversampled with a physical interface clock, which is generated from the PLL clock (and which is at a rate (baudrate/N), where N<M) to generate a physical interface sampled reset signal. The sampling of the synchronized reset signal can generate a physical interface sampled reset signal that has a known time relationship with the reset signal and the macro clock. In one example embodiment, the circuitry is configured so that when the physical interface sampled reset signal is in a first state, local physical interface clock generators do not toggle and, instead, stay in a predetermined state. When the physical interface sampled reset signal moves to a second state, the local physical interface clock generators start in a known state. The physical interface clock generators that generate the physical interface data clock at a rate of baudrate/M are programmable in x unit increment (UI) steps, where a UI is defined as the duration of a serial bit. Through use of the oversampling technique, a physical interface baudrate/M clock is produced with a known phase relationship (e.g., accurate within 2 UI) to the macro baudrate/M clock. The physical interface baudrate/M clock can be used to clock data into the local physical interface from the macro outputs that are clocked by the macro baudrate/M clock.

In one example embodiment, the circuitry is configured such that a reset signal for the core is clocked into a core macro flop using the macro clock (e.g., at a rate baudrate/40) to generate a macro clock synchronized reset. The macro clock synchronized reset is then oversampled with a physical interface clock, which is generated from the PLL clock (e.g., at a rate baudrate/2) to generate a physical interface sampled reset signal. The sampling of the synchronized reset signal can generate a physical interface sampled reset signal that has a known time relationship with the reset signal of the core and the macro clock. The circuitry is configured so that when the physical interface sampled reset signal is in a first state, local physical interface clock generators do not toggle and, instead, stay in a known state. When the physical interface sampled reset signal moves to a second state, the local physical interface clock generators start in a known state. The physical interface clock generators generate the physical interface data clock at a rate of baudrate/40, which is programmable in eight UI steps. Through use of the oversampling technique, a local physical interface baudrate/40 clock is produced with a known phase relationship accurate within 2 UI to the macro baudrate/40 clock. The physical interface baudrate/40 clock can be used to clock data into the local physical interface from the macro data flops that are being clocked by the macro baudrate/40 clock. In alternative embodiments, the clock rates and relative clock rates can be varied, along with other design parameters, as necessary to give different phase relationships.

DESCRIPTION OF THE DISCLOSURE

Figure 1:
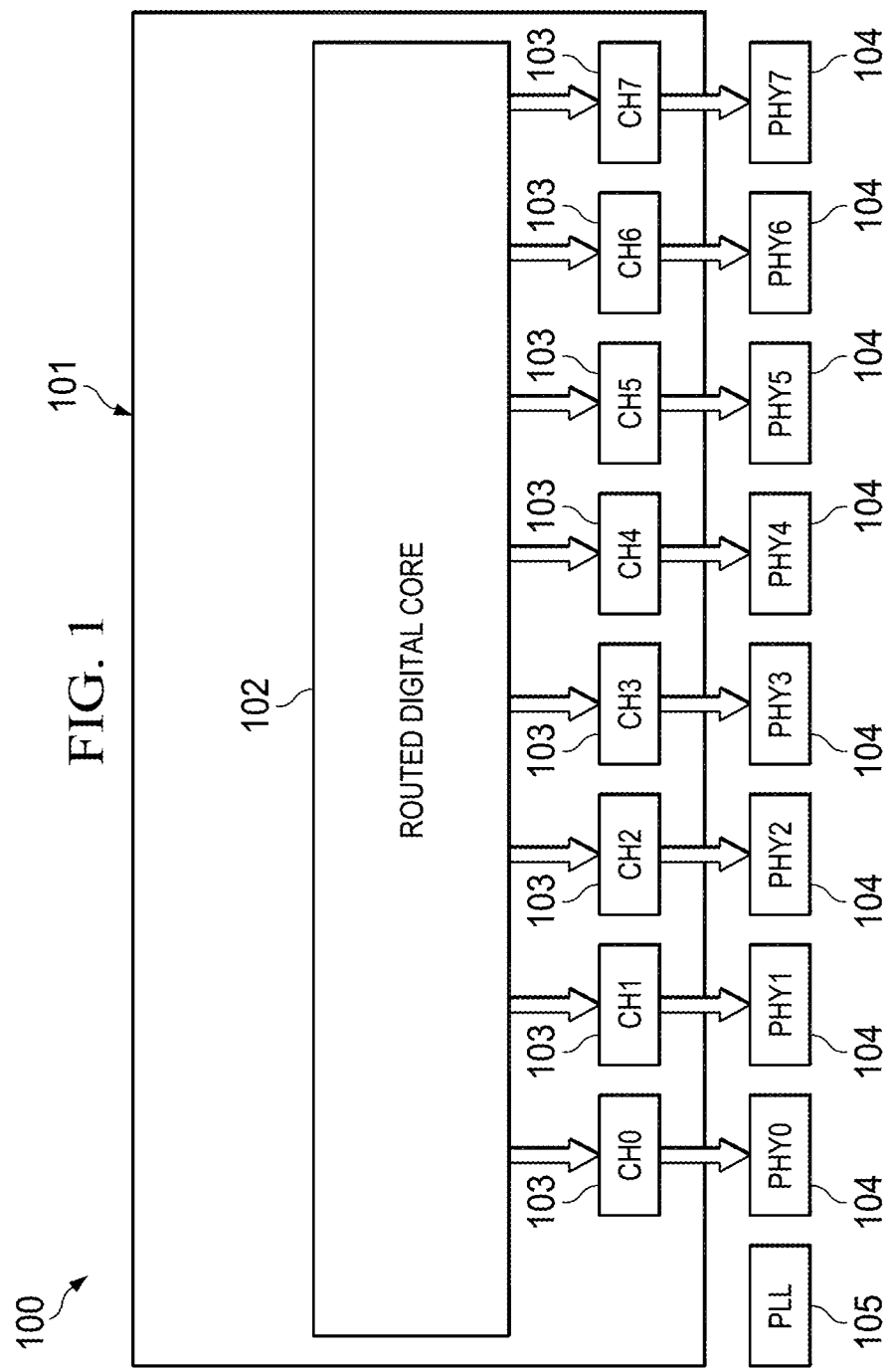
FIG. 1 is a simplified schematic diagram illustrating a system architecture according to an embodiment of the disclosure.

Referring now to FIG. 1, therein is illustrated a system architecture 100 according to an embodiment of the disclosure. System architecture 100 comprises a core 101 that includes a routed digital core 102, a phase locked loop (PLL) 105, a plurality of physical interfaces (Phy0-Phy7) 104, and a plurality of macros (ch0-ch7) 103 for each Phy0-Phy7, respectively. Macros 103 are provided on core 101 in this example implementation. PLL 105 is configured to generate a local clock that drives the clocks in each of Phy0-Phy7. In the example of FIG. 1, the digital core is shown interfacing with eight physical interfaces Phy0-Phy7. However, the actual number of interfaces communicating with a core could vary from one to any number. Each of macros 103 (ch0-ch7) comprises a macro in core 101 that interfaces routed core 102 to one of the high-speed serial channels, Phy0-Phy7, respectively. In one example embodiment, data from routed core 102 is clocked onto the output of each macro, ch0-ch7, at the macro clock (pclk_core) rate that is baudrate/40. The data is received and clocked into each physical channel Phy0-Phy7 by the physical interface clock (pclk_phy), which is also at baudrate/40. In one example embodiment, the pclk_phy of each interface Phy0-Phy7 is separately treatable for synchronization to a known degree to the pclk_core of the macro from which it receives its data.

In operation of one example general implementation, the baudrate PLL contains a 'divided by 2' block to generate a PLL differential baudrate/2 signal. The PLL baudrate/2 clock signals can be physically distributed to eight PHY locations. The individual PHY's can contain a 'divide by 2' section to produce a local PHY differential baudrate/4 clock from the local PHY baudrate/2 clock. The individual PHY's can contain a 'divide by 4' section to produce a local PHY differential baudrate/8 clock from the local PHY baudrate/2 clock. The local PHY baudrate/4 and baudrate/8 clocks can be resampled by the local PHY baudrate/2 clock for synchronization.

The local PHY baudrate/2 clock can be statically delayed to match the phase delay of the local PHY baudrate/4 and baudrate/8 clocks. The PHY's can contain a 'divide by 5' section to produce a local PHY baudrate/40 clock from the local PHY baudrate/8 clock. The local PHY clock distribution network, for all local PHY clocks, can be managed to provide known static delays between the local PHY: baudrate/2, baudrate/4, baudrate/8, and baudrate/40 clocks. A local hard macro can be placed at each of the 8 core-to-PHY physical locations. Each local hard macro can include standard cell flip flops (e.g., 42): 40 data flops, a parity bit flop, and a reset flop. The flops in the local hard macro can be clocked with the same local core baudrate/40 clock to assure a timing relation. The eight different physical hard macro locations can have eight different local hard macro core baudrate/40 clock nets. There can be time skew between each of the eight hard macro local core baudrate/40 clock nets. A global reset signal can be asserted and de-asserted by the core to synchronize the channels. The global reset signal is clocked into each local hard macro reset flop at each core-to-PHY boundary physical location by the local core baudrate/40 clock. Each individual PHY channel can sample the adjacent local hard macro reset signal with the local PHY baudrate/2 clock to produce a local PHY sampled reset signal. Details associated with these activities are discussed below, with reference to particular examples and FIGURES that further highlight some of the capabilities of the present disclosure.

Figure 2:
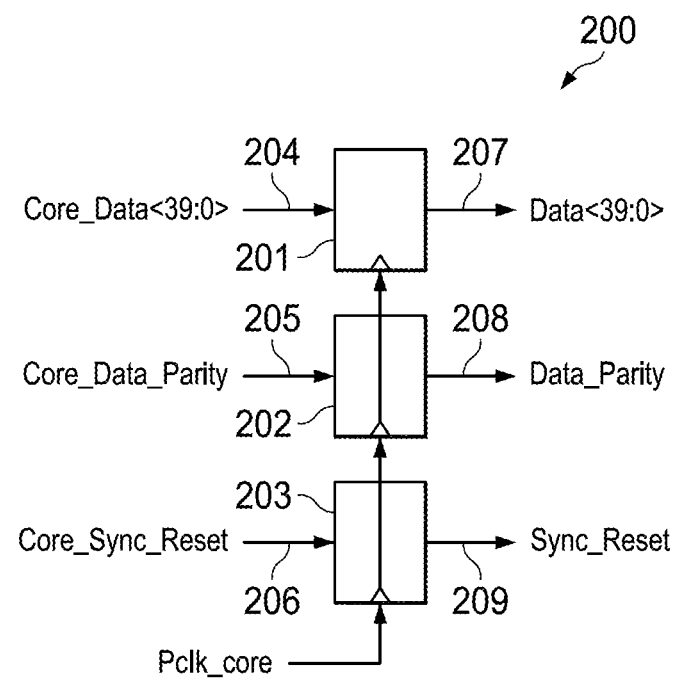
FIG. 2 is a simplified schematic diagram illustrating a core macro to physical channel interface according to an embodiment of the disclosure.

Referring now to FIG. 2, therein is illustrated a core macro to physical channel interface according to an embodiment of the disclosure. In the embodiment, each macro 103 comprises macro circuitry including a plurality of delay flip flops (DFFs) 201, 202, and 203. Each of the core_data, core_data_parity, and core_sync_reset signals are clocked off a plurality of interfaces 204, 205, 206, respectively by pclk_core. Further, this can be provided to DFFs 201, 202, and 203, respectively, and to each macro 103 of FIG. 1. Data<39:0>, the data_parity signal, and the sync_reset signal are then output to the input of a plurality of physical interfaces 207, 208, and 209, respectively. It can be seen from FIG. 2 that the use of the macro provides certain advantages that can be utilized further in interfacing with the physical interface. The sync_reset_signal for the physical interface may provide pclk_core edge transition information and the Data<39:0> is edge (phase) aligned with the sync_reset. In addition, the pclk_core skew can be constrained to the macro circuitry (e.g., DFFs 201, 202, and 203) and not depend on signals that route through other portions of core 101.

Figure 3:
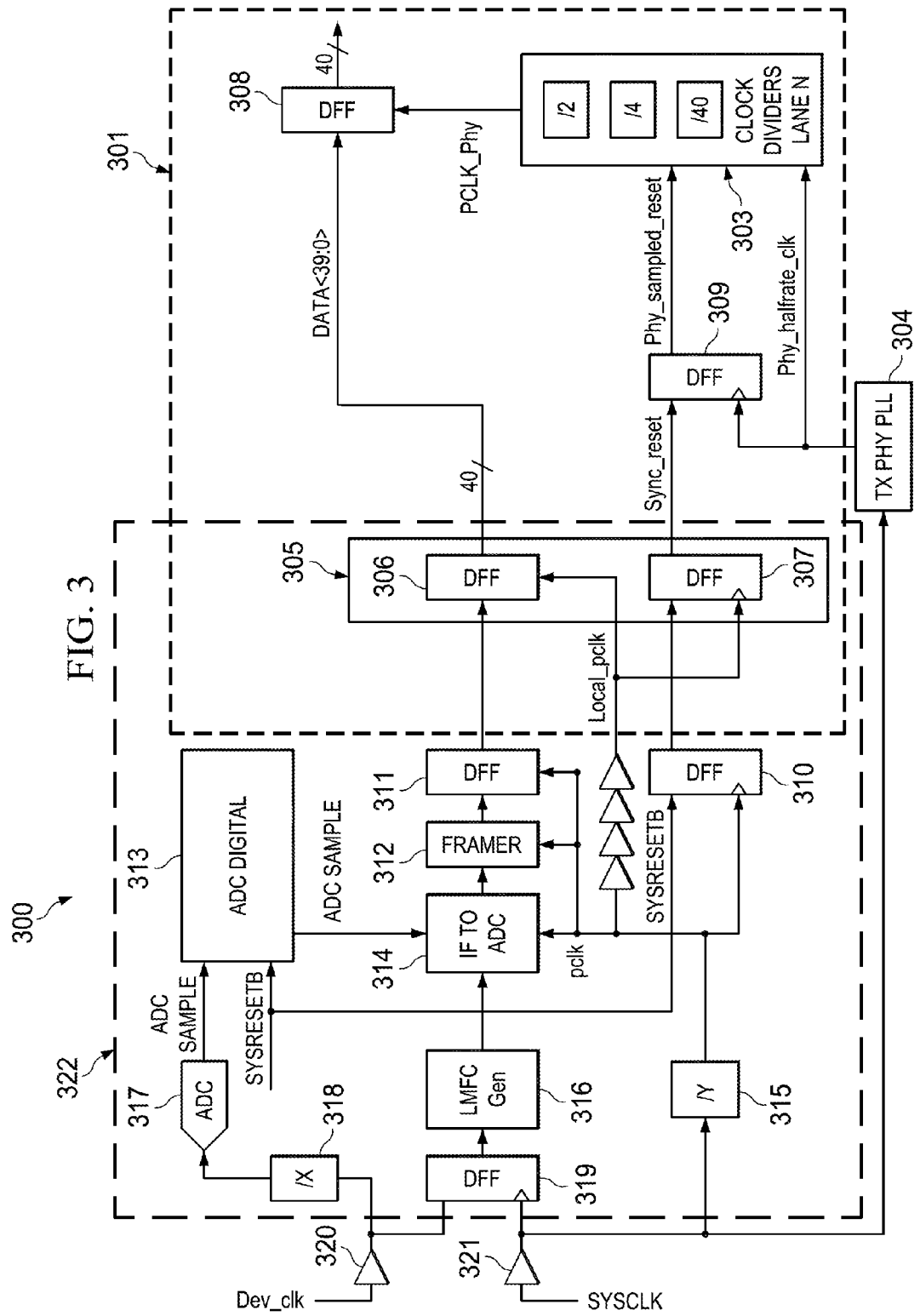
FIG. 3 is a simplified logic diagram of circuitry according to an embodiment of the disclosure.

Referring now to FIG. 3, therein is illustrated a logic schematic of example circuitry 300 according to an embodiment of the disclosure. Circuitry 300 comprises an ADC digital core 322, a local data channel 301, a core macro 305, and a PLL 304. A clock generator 303, a DFF 308, and a DFF 309 are provided in the physical interface. FIG. 3 illustrates one local data channel 301, which in the embodiment of FIG. 1, could be one of eight separate data channels, where each of the channels comprises the circuitry shown within local data channel 301 and interfaces with digital core 322 in FIG. 3. Core macro 305 has a local clock pclk_core that clocks the inputs and outputs of core macro 305. The physical channel uses a clock generated from PLL 304.

Digital core 322 comprises an ADC component 317 that inputs ADC samples to an ADC digital block 313. The ADC input can be clocked by a dev_clk as divided by X in a divider 318. ADC digital block 313 outputs a processed ADC sample to "IF to ADC" block 314. A SYSCLK clock signal received at a buffer 321 can clock a DFF 319, which can clock a local multi frame clock (LMFC) generator (Gen) 316. LMFC Gen 316 inputs a clock to IF to ADC 314. The SYSCLK clock [also divided by Y in a divider 315] becomes pclk and then clocks IF to ADC 314, framer 312, and DFF 311 to process, format, and frame the ADC digital data output by the ADC digital block 313. The digital data is then clocked out of DFF 311 to DFF 306 of core macro 305. DFF 306 then is clocked by the macro clock local_pclk to output data to the physical channel onto the inputs of an interface of DFF 308. The local_pclk is a clock on core macro 305. It is also referred to in this description as the pclk_core clock. The names local_pclk and pclk_core can be used interchangeably for the same clock. The data is clocked into the physical interface by physical interface clock pclk_phy at DFF 308. In one example embodiment, each channel receives data comprising 40 bits in parallel. 40 bits is used here for example only and the actual number of bits in parallel could be any number, depending on the necessary design parameters, the application, the environment, etc. In one example embodiment, for each physical channel, there would be 40 DFFs (as it relates to DFF 311), 40 DFFs (as it relates to DFF 306), and 40 DFFs (as it relates to DFF 308) to implement the parallel data transfer.

SYSRESETB is a global reset signal that may be used to reset the ADC core. SYSRESETB is also clocked into a DFF 310 by pclk. The output of DFF 310 is clocked into DFF 307 of the macro 305 by pclk_core. DFF 307 outputs a sync_reset signal to the physical data channel of DFF 309. Pclk_core is the same clock that clocks data out of DFF 306. PLL 304 generates a clock signal, PHY_halfrate_clk, from the SYSREF signal. Each physical channel can generate its own PHY_halfrate_clk clock from the distributed PLL clock. In the embodiment of FIG. 3, the PHY_halfrate_clk is at a frequency rate of baudrate/2. The PHY_halfrate_clk is used to sample the sync_reset signal received from DFF 307 of core macro 305 at DFF 309 in the physical interface. The embodiment may be implemented so that when SYS_RESETB moves high, the next rising edge of pclk_core clocks the high value through DFF 307 causing the sync_reset out of the macro to move high on the rising edge of SYS_RESETB.

Figure 4:
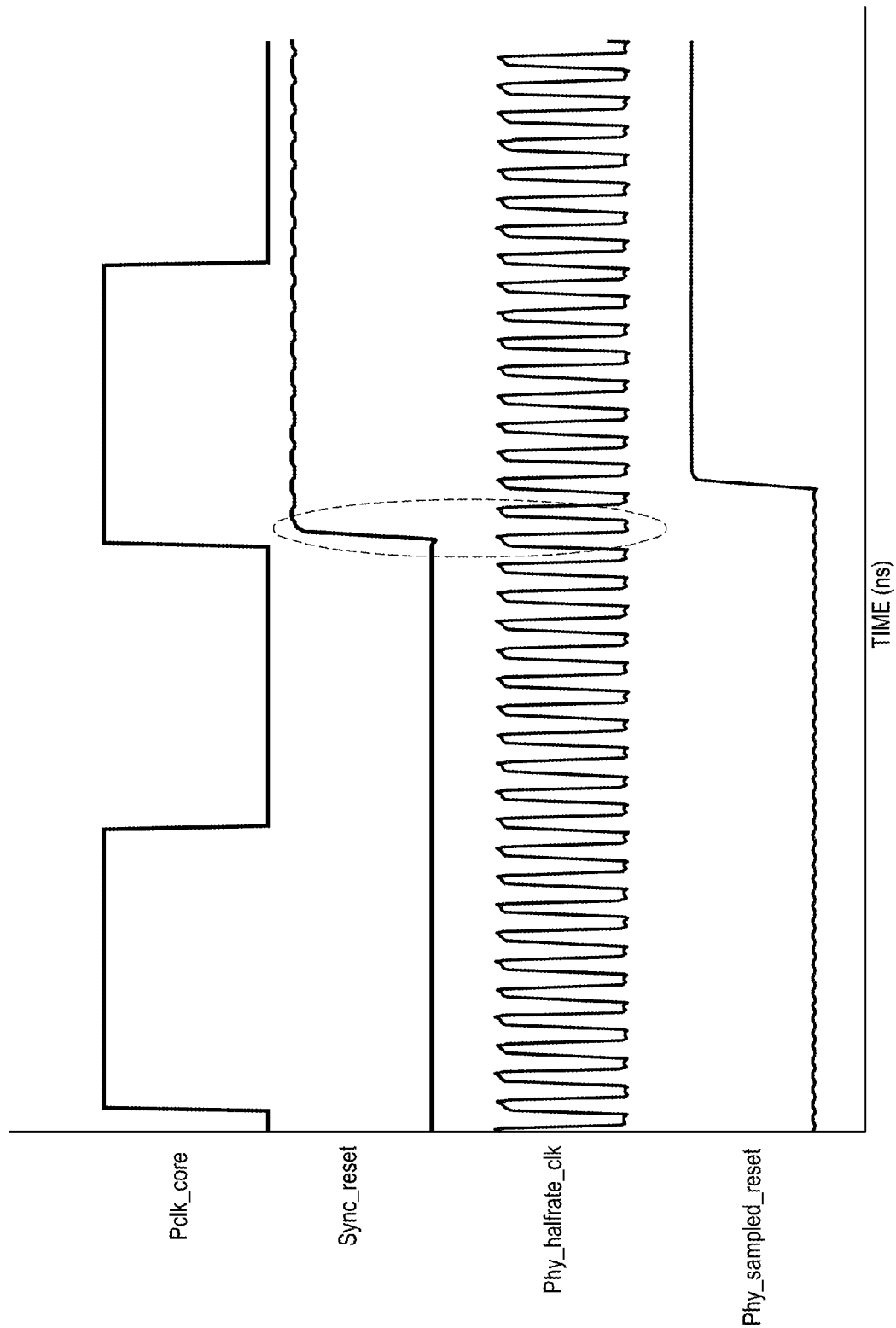
FIG. 4 is a simplified schematic diagram illustrating example synchronization signal waveforms according to an embodiment of the disclosure.

Referring now to FIG. 4, therein are illustrated synchronization signal waveforms according to an embodiment of the disclosure. FIG. 4 shows the macro clock, pclk_core, Sync_reset out of the macro, the PHY_halfrate_clk, and the sampled reset signal. Sync_reset is clocked to the output of DFF 307 on the rising edge of pclk_core. Sync_reset is then sampled using DFF 309 and PHY_halfrate_clk to generate Phy_sampled_reset. The dashed circle illustrates how the PHY_halfrate_clk will capture the rising edge of sync_reset within its cycle period on one of its rising edges or the next rising edge.

By using the same pclk_core clock of the macro (to both clock the data out of the macro onto the physical interface and clock a reset signal through to the physical interface), a reset of the pclk_phy can be more accurately aligned with pclk_core and the macro data. Also, by having the pclk_core clock and the circuitry that the data and the reset signals are clocked out of physically placed in the same macro, the data and signals are better aligned when input to the physical interface. This provides accurate timing for the data transfer since the outputs of macro 103 have a relationship to the pclk_phy clock in the functioning of the interface.

Figure 5:
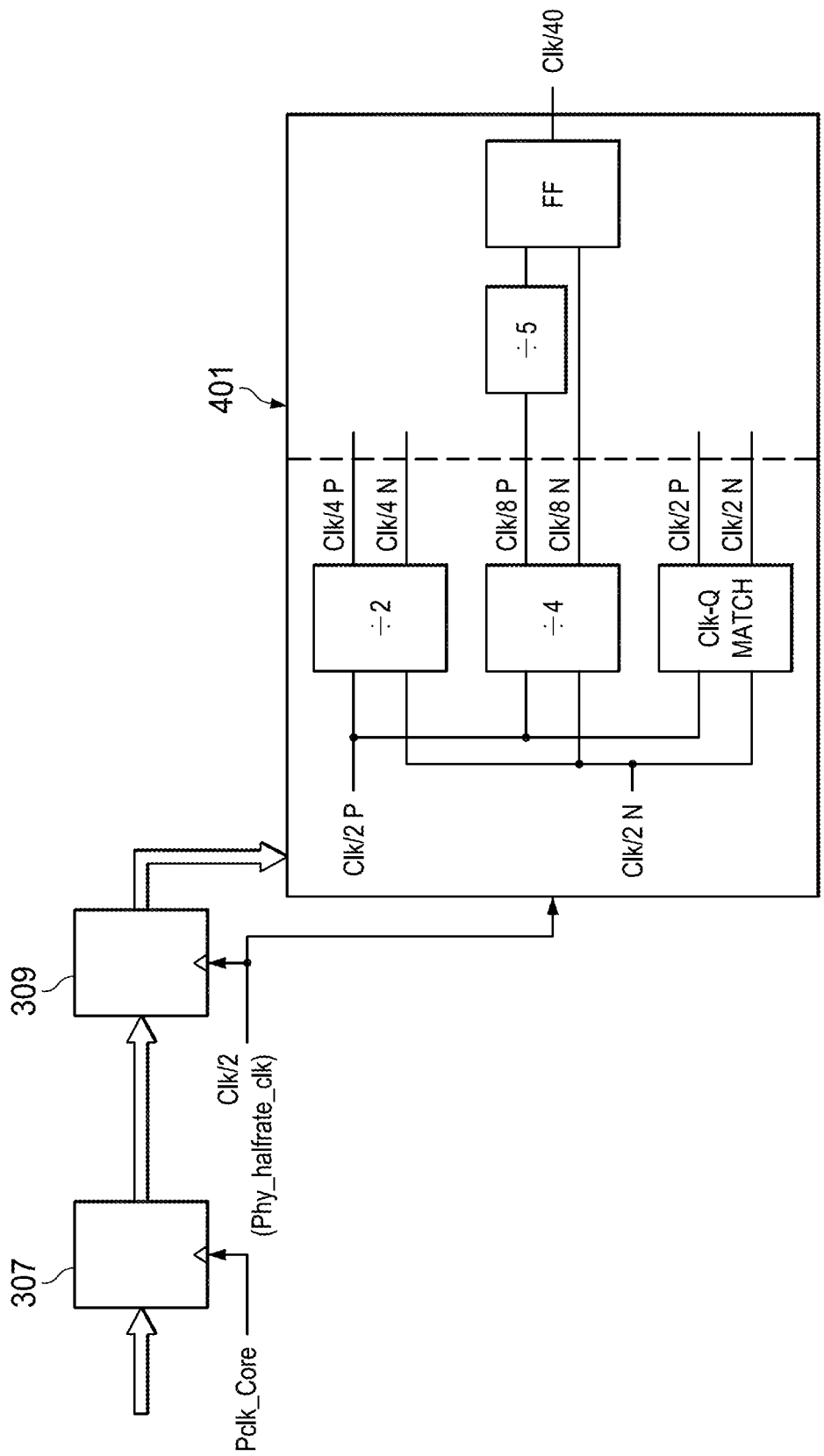
FIG. 5 is a simplified schematic diagram illustrating an example signal flow and clock divider circuitry according to an embodiment of the disclosure.

Referring now to FIG. 5, therein is illustrated signal flow and clock generator circuitry 401 according to an embodiment of the disclosure. Clock generator circuitry 401 shows a possible high-level implementation of clock generator 303 of FIG. 3. FIG. 5 shows signal flow from the SYSRESETB signal to the sync_reset to the phy_sampled_reset. Pclk_core clocks sync_reset into DFF 307, which is then sampled by PHY_halfrate_clk at DFF 309. The output of DFF 309 is Phy_sampled_reset, which is input to clock divider circuitry. Clk/40 is the physical interface clock that clocks the data into the physical interface from the output of the macro. The clock divider circuitry is configured so that the clocks of the physical interface can be reset to a predetermined state. Because the reset of the Clk/40 clock can be performed based on a timing relation to Sync_reset, which is in itself based on pclk_core that clocks the data out of DFF 306 of core macro 305, the Clk/40 clock in the physical interface has a known timing relation to pclk_core and the data coming from core macro 305. The pclk_phy clock that clocks the data into DFF 308 of the physical interface is taken from the Clk/40 output of the clock divider circuitry 401.

Figure 6:
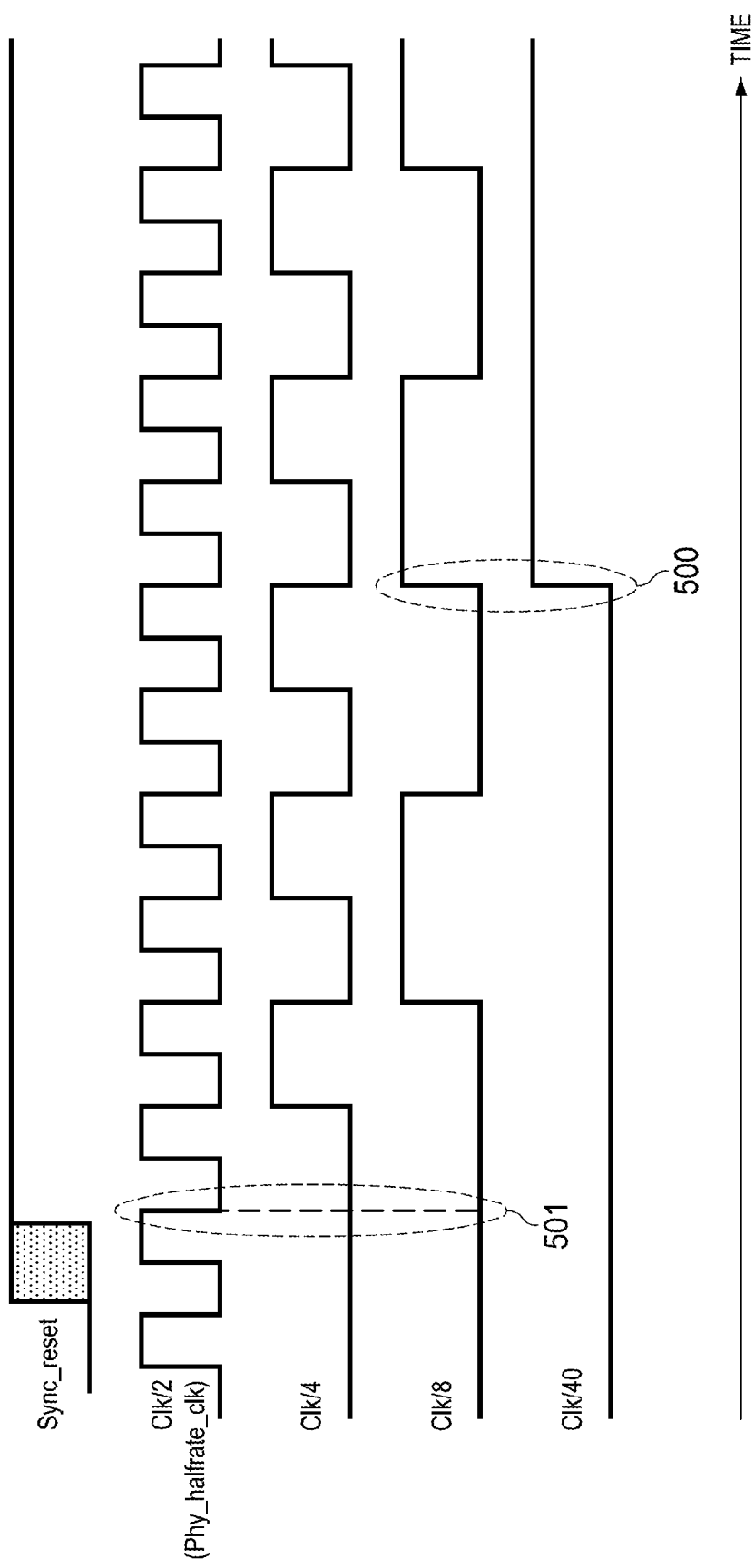
FIG. 6 is a simplified schematic diagram illustrating signal waveforms according to an embodiment of the disclosure.

Referring now to FIG. 6, therein are illustrated signal waveforms according to an embodiment of the disclosure. FIG. 6 illustrates Sync_reset as it is sampled by the PHY_halfrate_clk. A dashed circle 500 illustrates how the clock dividers clk4, clk8, and clk/40 generate a pclk_phy clock that is falling edge synchronized to the Sync_reset by the sampling of the Sync_reset using PHY_half_rate. The sampling provides the reset and release for the clock dividers generating pclk_phy. A dashed circle 501 shows how clk/40 will reset to move high in relation to the falling edge of the clk/8 signal four PHY_halfrate_clk signals after reset.

Figure 7:
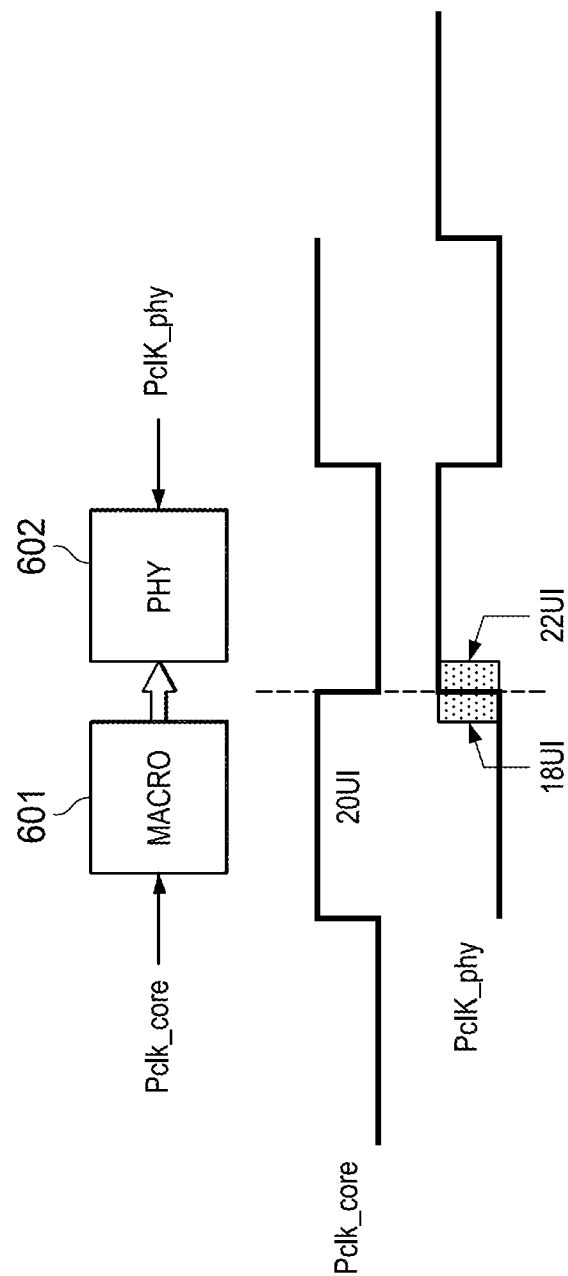
FIG. 7 is a simplified schematic diagram illustrating circuitry along with an accompanying interface timing diagram according to an embodiment of the disclosure.

Referring now to FIG. 7, FIG. 7 is a simplified schematic diagram with accompanying interface timing according to an embodiment of the disclosure. FIG. 7 illustrates the relationship between the clock pclk_core of a macro and the clock pclk_phy of a physical interface (e.g., interface 104 of FIG. 1). Referring back briefly to the embodiment of FIG. 3, because of the use of core macro 305 to generate the Sync_reset signal from pclk_core, and the sampling of Sync_reset by the Phy_half_rate clock to generate Phy_sampled_reset that is used in turn to reset pclk_phy, there is a known relation between the edges of pclk_core and pclk_phy. The edge of pclk_phy can be within a skew of plus or minus 2 UI from its expected point in time, in relation to the edge of pclk_core.

The term "expected point in time" is used in the embodiment of FIG. 3 to highlight that the clock dividers may be implemented as programmable so that they may generate pclk_phy to have an expected rising edge within plus or minus 2 UI of the rising edge of pclk_core. For example, if the rising edge of pclk_phy is programmed to be lined up to the rising edge of pclk_core, then it will be within the range plus 2 UI or minus 2 UI. FIG. 7 shows another example when the rising edge of pclk_phy is programmed to be lined up at 20 UI after the rising edge of pclk_core. At reference point 700 of FIG. 7, the rising edge of pclk_phy is seen to be between 18 UI and 22 UI after the rising edge of pclk_core.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus for interfacing a digital core with at least one physical interface, comprising:
a macro configured on the digital core, the macro having at least one data output, a first data input, a reset input and a sync reset output, the macro to be clocked by a first clock having a first clock rate, the first clock configured to:
clock in data from the digital core on the first data input;
clock in a reset signal from the digital core on the reset input, wherein a
synchronized reset signal is output on the sync reset output; and
physical interface circuitry having a second data input coupled to the data output of the macro, and a reset sampling input coupled to the sync reset output of the macro, the physical interface circuitry comprising a clock generator and clocked by a second clock having a second clock rate, and a third clock having a third clock rate, the second clock clocking data in from the macro into the physical interface, and the third clock sampling the synchronized reset signal from the macro at a rate greater than a rate of the first and second clocks, wherein when a transition is detected on the synchronized reset signal the clock generator resets the second clock to a predetermined state.

2. The apparatus of claim 1, wherein the physical interface has a baudrate for data transfer, and wherein the first and second clocks are each at a rate of baudrate/M, and the third clock samples the synchronized reset signal at a rate of baudrate/N, where M is greater than N.

3. The apparatus of claim 1, wherein the first and second clocks each have a first edge, and the clock generator in the physical interface circuitry resets the second clock so that the first edge of the second clock starts with a known offset to the first edge of the first clock.

4. The apparatus of claim 3, wherein the physical interface has a baudrate and the third clock is at a rate of baudrate/N and the first edge of the first clock and the first edge of the second clock are reset to be aligned to between the known offset plus N UIs and the known offset minus N UIs.

5. The apparatus of claim 4, wherein the first clock is at a rate baudrate/M, and wherein sampling done by the physical interface circuitry provides the generator M/N steps of phase knowledge for initializing the second clock.

6. The apparatus of claim 1, wherein the third clock of the physical interface circuitry samples with the third clock at a rate of M/N times the first clock rate, and wherein the generator resets the second clock to within plus or minus N unit increments (UIs) of a predetermined state.

7. The apparatus of claim 1, wherein the generator in the physical interface circuitry comprises clock divider circuitry that generates the second clock from the third clock.

8. The apparatus of claim 1, wherein the physical interface has a baudrate for data transfer and the first clock is at a rate of baudrate/M, the second clock is at a rate of baudrate/M and the third clock is at a rate of baudrate/N.

9. The apparatus of claim 8, wherein M=40 and N=2.

10. The apparatus of claim 1, wherein the apparatus is implemented in an application specific integrated circuit (ASIC), a field programmable gate array (FPGA), a multi-chip module (MCM), or a system on a chip (SOC) package.

11. A method for interfacing a digital core to at least one physical interface, comprising:
clocking data from the digital core onto a first data output of a macro using a first clock, the first clock being a macro clock;
clocking the data from the first data output of the macro into the physical interface using a second clock, the second clock being a physical interface clock;
clocking a first reset signal from the digital core onto a reset output of the macro using the macro clock, the first reset signal output used as a second reset signal;
sampling the second reset signal using a third clock, which provides a clock rate greater than the rate of the second clock, to generate a sampled reset signal; and
resetting the second clock to a predetermined state in the physical interface in response to a transition of the sampled reset signal.

12. The method of claim 11, further comprising clocking the data into the physical interface using the second clock that was reset in the resetting of the second clock.

13. The method of claim 11, wherein the third clock used in the sampling is generated from a phase lock loop.

14. The method of claim 11, wherein the resetting comprises resetting clock generation circuitry in the physical interface to start the second clock in a known state.

15. The method of claim 11, wherein the resetting further comprises resetting clock generation circuitry in the physical interface to start a first edge of the second clock with a known offset to a first edge of the first clock.

16. The method of claim 15, wherein the physical interface has a baudrate and unit interval (UI), and the third clock is at a rate baudrate/N, and the first edge of the first clock and the first edge of the of the second clock are aligned between the known offset plus N UIs and the known offset minus N UIs.

17. The method of claim 16, wherein the first clock is at a rate of baudrate/M, and the sampling provides M/N steps of phase knowledge for initializing the physical interface clock generators.

18. The method of claim 11, wherein the physical interface comprises a clock generator, and the sampling is performed by the third clock at a rate of R times a rate of the first clock, and wherein the resetting comprises initializing the clock generator to reset the second clock to a predetermined state, wherein the sampling provides R steps of phase knowledge to the clock generator for initializing the second clock.

19. An apparatus for interfacing a digital core to at least one physical interface, comprising:
a macro comprising:
macro data circuitry clocked by a macro clock, the macro data circuitry having a first data input and a first data output, the macro data circuitry being configured for receiving data from the digital core on the first data input and clocking data onto the first data output in response to the macro clock;
macro sync circuitry, clocked by the macro clock, the macro sync circuitry having a first sync input and a first sync output, the macro sync circuitry being configured for receiving a core reset signal on the first sync input, and configured for generating a synchronized reset signal synchronized with the macro clock on the first sync output; and
an interface circuitry comprising:
interface data circuitry clocked by a first interface clock, the interface data circuitry having a second data input coupled to the first data output, the interface data circuitry for receiving the data from the macro data circuitry on the first data output and clocking the data into the interface in response to the first interface clock;
interface sampling circuitry clocked by a second interface clock having a greater clock rate than the macro clock rate, the interface sampling circuitry having a second sync input coupled to the first sync output of the macro sync circuitry and a second sync output, the interface sampling circuitry for receiving the synchronized reset signal from the macro sync circuitry on the second sync input and generating an interface sample signal on the second sync output in response to the second interface clock; and
a clock generator, clocked by the second interface clock, the clock generator having a third sync input coupled to the second sync output of interface sampling circuitry, the clock generator configured for receiving the interface sample signal and configured for resetting the first interface clock to a predetermined state in response to the interface sample signal.

20. The apparatus of claim 19, wherein the clock generator resets the first interface clock to a predetermined state by resetting the first interface clock so that an edge of the first interface clock starts with predetermined offset from an edge of the macro clock.

21. The apparatus of claim 19, wherein the interface has a baudrate and the second interface clock has a rate of baudrate/2.

22. The apparatus of claim 19, wherein the apparatus is implemented in an application specific integrated circuit (ASIC), a field programmable gate array (FPGA), a multi-chip module (MCM), or a system on a chip (SOC) package.

23. A system for interfacing a digital core to at least one physical interface, comprising:
   means for clocking data from the digital core onto a first data output of a macro using a first clock, the first clock being a macro clock;
   means for clocking the data from the first data output of the macro into the physical interface using a second clock, the second clock being a physical interface clock;
   means for clocking a first reset signal from the digital core onto a reset output of the macro using the macro clock, the first reset signal output to be used as a second reset signal;
   means for sampling the second reset signal using a third clock, the third clock providing a clock rate greater than the rate of the second clock, to generate a sampled reset signal; and
   means for resetting the second clock to a predetermined state in the physical interface in response to a transition of the sampled reset signal.

24. The system of claim 23, further comprising means for clocking the data into the physical interface using the second clock that was reset in the resetting of the second clock.

25. The system of claim 23, wherein the means for resetting comprises means for resetting clock generation circuitry in the physical interface to start the second clock in a known state.

26. The system of claim 23, wherein the means for resetting further comprises means for resetting clock generation circuitry in the physical interface to start a first edge of the second clock with a known offset to a first edge of the first clock.

27. The system of claim 26, wherein the physical interface has a baudrate and unit interval (UI), and the third clock is at a rate baudrate/N, and the first edge of the first clock and the first edge of the of the second clock are aligned between the known offset plus N UIs and the known offset minus N UIs.

28. The system of claim 27, wherein the first clock is at a rate of baudrate/M, and the sampling provides M/N steps of phase knowledge for initializing the physical interface clock generators.

29. The system of claim 23, wherein the physical interface comprises a clock generator, and the sampling is performed by the third clock at a rate of R times a rate of the first clock, and wherein the means for resetting comprises means for initializing the clock generator to reset the second clock to a predetermined state, wherein the sampling provides R steps of phase knowledge to the clock generator for initializing the second clock.

* * * * *